Jan. 9, 1968  I. D. DE BELLA  3,362,400
URINE MEASURING AND ANALYZING DEVICE
Filed June 18, 1964
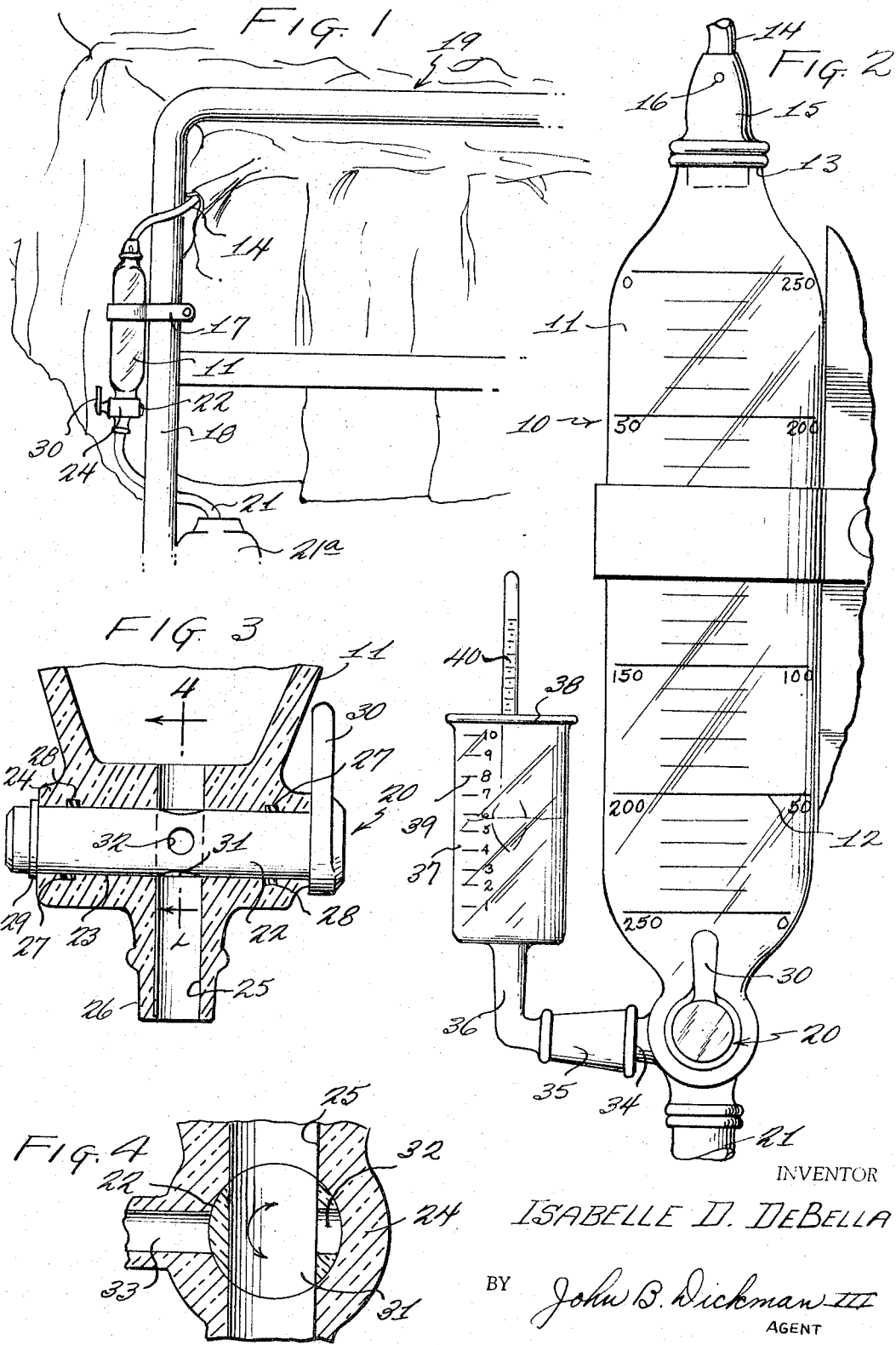
INVENTOR
ISABELLE D. DeBELLA
BY John B. Dickman III
AGENT

United States Patent Office 3,362,400
Patented Jan. 9, 1968

3,362,400
URINE MEASURING AND ANALYZING DEVICE
Isabelle D. De Bella, 4105 Wisconsin Ave.,
Washington, D.C. 20016
Filed June 18, 1964, Ser. No. 376,159
3 Claims. (Cl. 128—2)

This invention relates to a urine measuring and analyzing device, and has as its primary object the provision of a device by means of which the quantity of urine passed by a patient during a predetermined period may be accurately and expeditiously measured without the necessity of interchanging vessels or manipulating the urine receptacle.

An additional very important object of the invention is the provision, in association with such a measuring device, of an open-topped relatively small graduated receptacle which may be either partially or completely filled from the main receptacle and independently emptied, which will permit the exposure of a predetermined quantity of urine for such analyses as sugar, protein, pH, acetone and the like.

An additional object is the provision of such an auxiliary receptacle which permits the ready introduction of a hydrometer for determining the specific gravity of the urine at such predetermined intervals as may be necessary or desirable.

A further object of the invention is the provision of an auxiliary open-topped vessel or receptacle of this nature which may be drained and refilled from the contents of a larger vessel as many times as may be necessary, and the quantity of urine drawn off accurately determined so that the overall quantitative measurement is not affected.

A further object of the invention is the provision of a device of this character which will accurately measure the amount to be subtracted from the total contents when an irrigation solution is used.

Still another object of the invention is the provision of such a device wherein the several components are readily disassembled and assembled for cleaning, sterilization or other purposes.

Still other objects will in part be obvious, and in part be pointed out as the description of the invention proceeds and shown in the accompanying drawing wherein there is illustrated a preferred embodiment of this inventive concept.

In the drawing:

FIGURE 1 is a perspective view of one form of the device embodying the instant inventive concept, shown as attached to a hospital bed.

FIG. 2 is an enlarged side elevational view of the device.

FIG. 3 is an enlarged cross sectional view through the valve mechanism comprising an element of the invention.

FIG. 4 is a sectional view taken substantially along the line 4—4 of FIG. 3 as viewed in the direction indicated by the arrows.

Similar reference characters refer to similar parts throughout the several views of the drawing.

Having reference now to the drawing in detail, the device of the instant invention is generally indicated at 10 and comprises a separatory funnel 11, preferably of transparent material, of any desired size, and provided with measuring graduations 12 along one side thereof. The reduced top 13 of the funnel has attached thereto a straight drainage tube 14 which is provided with a rubber adaptor skirt 15 having a vent hole 16 therein. The drainage tube 14 is attached to an indwelling catheter of known type, which is not shown.

Funnel 11 is attached in any desired manner as by a conventional C clamp 17 to the bedpost 18 of a conventional hospital bed generally indicated at 19.

The lower portion of funnel 11 is provided with a valve assembly generally indicated at 20 and to be more fully described hereinafter, which when in one position will empty the contents of the funnel 11 into a drainage tube 21, from which it is conveyed to a jug 21a or the like for removal, after measuring.

Valve assembly 20 consists of a straight glass rod 22 which extends through a transverse bore 23 in an enlarged boss 24 which intersects passage 25 which extends vertically from the bottom of funnel 11 to a reduced tapered end portion 26, to which the drainage tube 21 is attached. The rod is surrounded by O-rings 27 on opposite sides of passage 25, which seat in grooves 28 in the bore to seal the assembly. A clamping washer 29 on one extending end of rod 22 serves to retain the parts in related assembly, while an integrally operating handle 30 is fixed to the opposite end of the rod. Rod 22 has a straight passage 31 extending therethrough of substantially the same diameter as the passage 25 which, when aligned with the passage, permits complete drainage of the receptacle or funnel 11. A reduced passage 32 communicates with and extends at right angles to passage 31, and when the valve is properly aligned, permits urine from the funnel to flow into a laterally extending passage 33, which extends into a projection 34 to which is secured a "Luer" lock fitting 35, which connects thereto an L-shaped tube 36. The upper portion of L-shaped tube 36 is integral with the bottom of an auxiliary receptacle 37 which is provided with an open top 38 and is suitably graduated along its side as at 39. The receptacle 37 is also formed of transparent material, and may be of any desired size.

From the foregoing, the use and operation of the device should now be readily understandable. When the valve 20 is in closed position, urine draining from the bladder of the patient through the catheter fills the funnel 11 gradually so that the amount passed during any predetermined period of time may be readily determined by observation of the graduations 12. Opening the valve 20 by a half turn will permit a predetermined quantity of urine, readily measureable by observation of the graduations 39, to flow into the receptacle 37, the specific gravity thereof being readily obtainable by means of a hydrometer 40, or a selected quantity treated with chemical re-agents or otherwise tested in any desired manner. A further turn of valve handle 30 so that passage 32 extends downwardly, and it will drain the contents of auxiliary receptacle 37 while retaining the remainder of the urine in funnel 11, while a turn of the valve to the position shown in FIGS. 3 and 4 will permit complete drainage of the funnel 11.

From the foregoing it will now be seen that there is herein provided a device for the accurate measuring and analysis of urine which accomplishes all of the objects of this invention and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

1. A urine measuring and analyzing device comprising a graduated transparent receptacle, a fitting at the top thereof, a tube adapted to be connected to an indwelling catheter connected to said fitting, a three way valve at the bottom of said receptacle, means defining a drainage passage normally closed by said valve, means defining a second passage extending transversely to said drainage passage, said last named means selectively communicated with opposite sides of said drainage passage or closed by said valve, an auxiliary, transparent, graduated vessel, a testing device within said vessel, and means communicating said auxiliary vessel with said second passage, thus forming an overall generally U-shaped apparatus.

2. The structure of claim 1 wherein said valve comprises a glass rod having a handle at one end thereof and extending through a transverse bore at the base of said first mentioned receptacle and having first and second intersecting passages therein, and a releasable lock washer secures said rod in said bore, whereby said valve may be readily disassembled for sterilizing.

3. The structure of claim 1 in which said communicating means between said receptacle and said vessel has quick attachable and detachable means associated with said communicating means.

References Cited

UNITED STATES PATENTS

| | | | |
|---|---|---|---|
| 2,485,842 | 10/1949 | Pennington | 128—214 |
| 2,584,397 | 2/1952 | Pitman | 128—272 X |
| 2,648,981 | 8/1953 | Drake | 73—215 |
| 2,859,956 | 11/1958 | Meriam | 128—2 |
| 2,998,722 | 9/1961 | Jaquith | 73—219 |
| 3,194,069 | 7/1965 | Scott | 73—219 |

FOREIGN PATENTS 562,061   8/1923   France.

OTHER REFERENCES

"Laboratory Equipment and Supplies," Eimor & Amend, 1936, page 102.

RICHARD A. GAUDET, *Primary Examiner.*

SIMON BRODER, *Examiner.*